US012603020B2

(12) United States Patent
Koehler

(10) Patent No.: US 12,603,020 B2
(45) Date of Patent: Apr. 14, 2026

(54) DISPLAY STAND WITH CARDBOARD BASE

(71) Applicant: Hinrich Koehler, Tallahassee, FL (US)

(72) Inventor: Hinrich Koehler, Tallahassee, FL (US)

( * ) Notice: Subject to any disclaimer, the term of this patent is extended or adjusted under 35 U.S.C. 154(b) by 99 days.

(21) Appl. No.: 18/852,604

(22) PCT Filed: Mar. 31, 2023

(86) PCT No.: PCT/EP2023/058515
§ 371 (c)(1),
(2) Date: Sep. 30, 2024

(87) PCT Pub. No.: WO2023/194247
PCT Pub. Date: Oct. 12, 2023

(65) Prior Publication Data

US 2025/0218311 A1 Jul. 3, 2025

(30) Foreign Application Priority Data

Apr. 4, 2022 (DE) ..................... 10 2022 108 028.5

(51) Int. Cl.
*G09F 1/06* (2006.01)
*G09F 1/04* (2006.01)

(52) U.S. Cl.
CPC . *G09F 1/06* (2013.01); *G09F 1/04* (2013.01)

(58) Field of Classification Search
CPC ..................................... G09F 1/04; G09F 1/06
(Continued)

(56) References Cited

U.S. PATENT DOCUMENTS 1,762,900 A * 6/1930 Todd .................... B65D 5/5246 229/125
3,216,582 A * 11/1965 Cross ........................ B42F 7/10 D19/75

(Continued)

FOREIGN PATENT DOCUMENTS

DE 1936326 U 4/1966
DE 7523165 U 12/1975

(Continued)

OTHER PUBLICATIONS (1) International Search Report and Written Opinion (with English translation), issued in PCT/EP2023/058515, mailed Jul. 21, 2023 [11 Pages] (2) Machine-Generated English translation for DE1936326U; Espacenet [8 Pages].

*Primary Examiner* — Kyle R Grabowski
(74) *Attorney, Agent, or Firm* — ICE MILLER LLP; Justin D. Swindells

(57) ABSTRACT

A display stand with a planar base body made of cardboard. Planar sections are pivotably connected to each other by a set-up fold. Inner surfaces of a first and second planar cover body made of cardboard rest on inner surfaces of the planar sections and are partially glued thereto. Adhesive-free pocket regions are formed between the respective inner surface of the first cover body and of a first planar section and between the respective inner surface of the second cover body and of a second planar section, which pocket regions are adjacent to the set-up fold. A flat metal strip is arranged bridging the set-up fold with a first part in the first pocket region and with a second part in the second pocket region and is thereby held displaceably in at least one of the pocket regions without material connection to the respective cover body and planar section.

14 Claims, 5 Drawing Sheets

(58) Field of Classification Search
USPC ............................ 40/539; 229/117.04; 412/3
See application file for complete search history.

(56) References Cited

U.S. PATENT DOCUMENTS

| | | | | | |
|---|---|---|---|---|---|
| 3,713,578 | A * | 1/1973 | Johnson | ............... | B65D 5/6697 229/125 |
| 3,973,720 | A * | 8/1976 | Schmid | ................ | B65D 81/054 206/523 |
| 4,070,489 | A | 1/1978 | Pahnke | | |
| 2009/0025263 | A1 * | 1/2009 | Ross | .................... | B42D 15/042 493/381 |
| 2009/0098328 | A1 * | 4/2009 | Bennett | ..................... | G09F 1/10 428/40.9 |
| 2010/0319607 | A1 | 12/2010 | Julnes | | |

FOREIGN PATENT DOCUMENTS

| | | | | |
|---|---|---|---|---|
| GB | 1601120 | A * | 10/1981 | .............. A47F 5/112 |
| KR | 1020180122833 | A | 4/2020 | |
| WO | 2009052240 | A1 | 4/2009 | |
| WO | 2019156436 | A1 | 8/2019 | |

* cited by examiner

Fig. 1
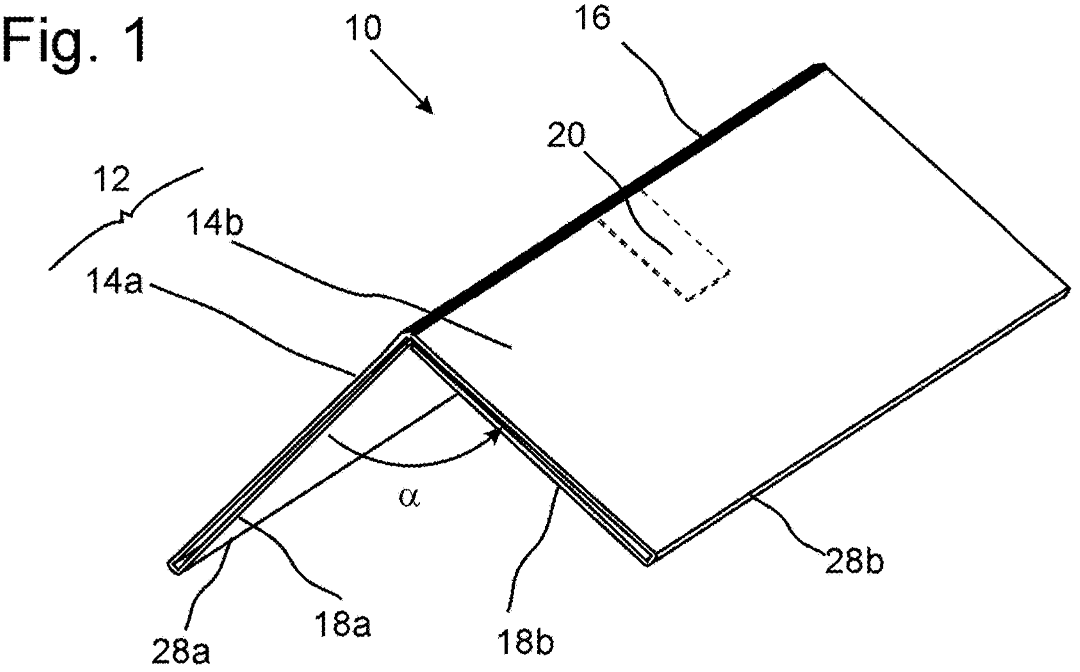
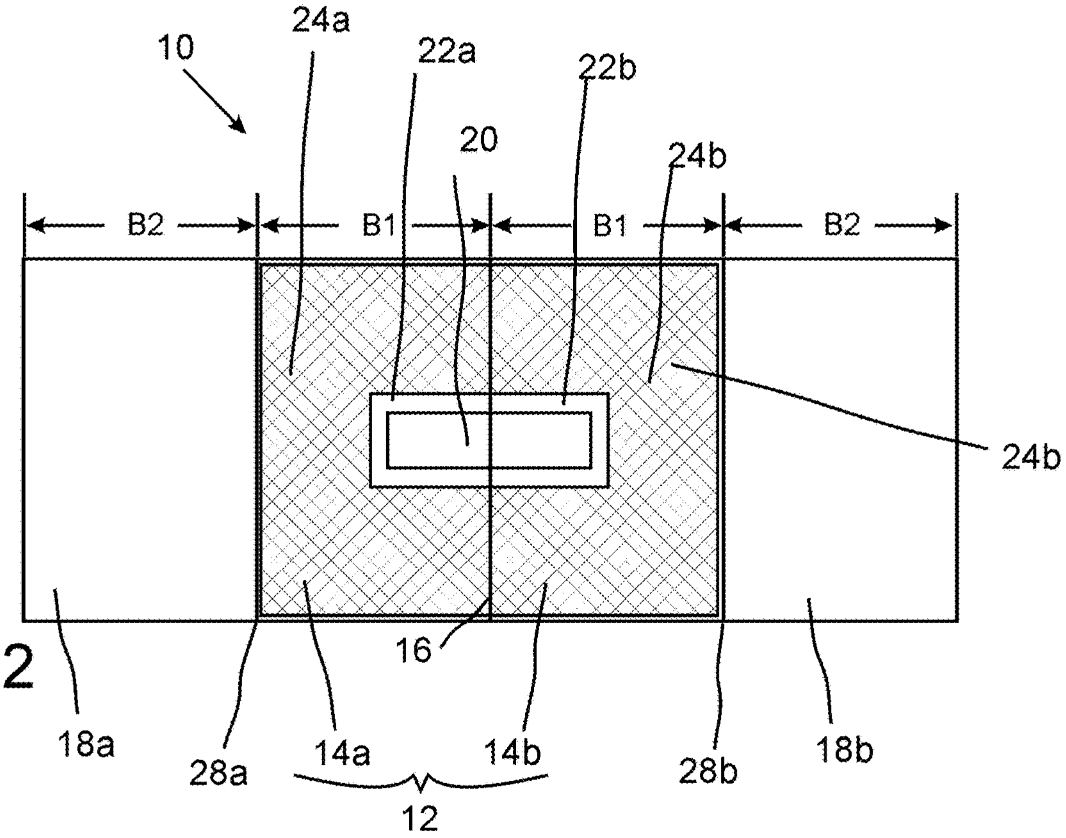
Fig. 2

Fig. 3a
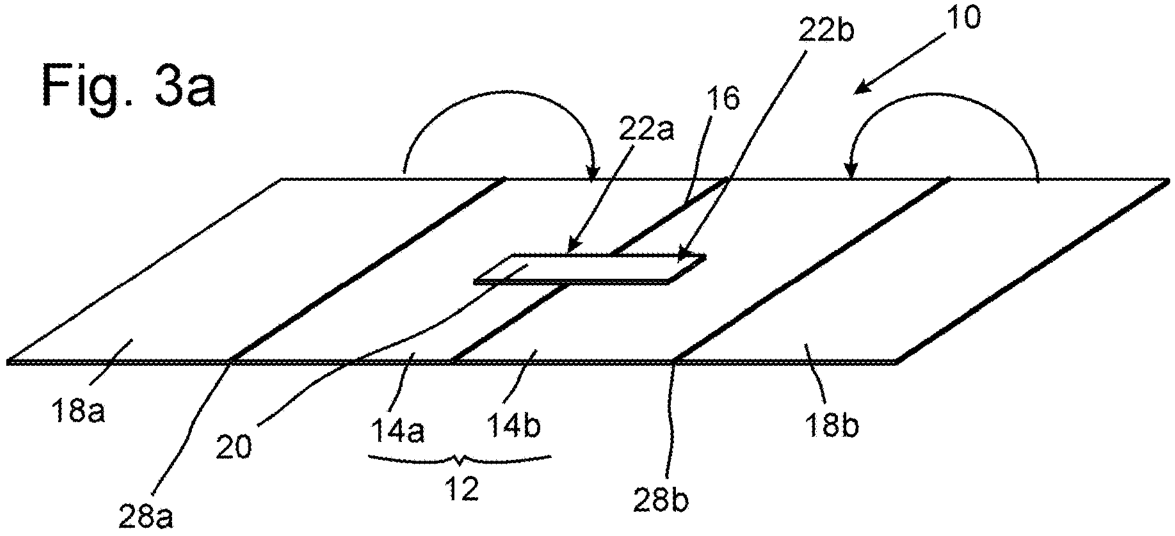
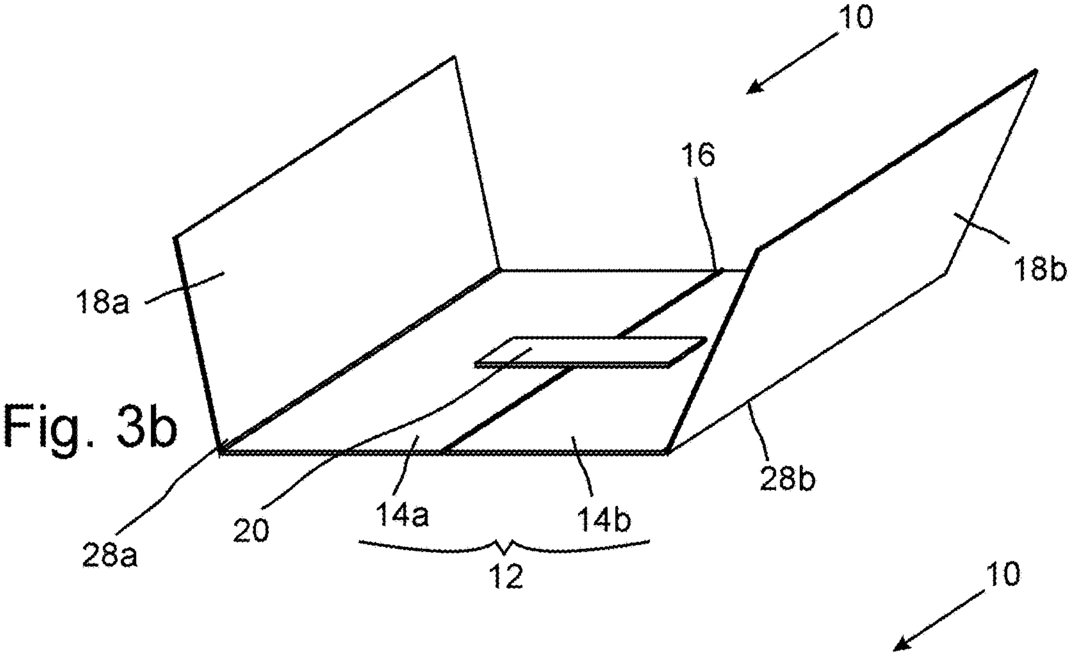
Fig. 3b
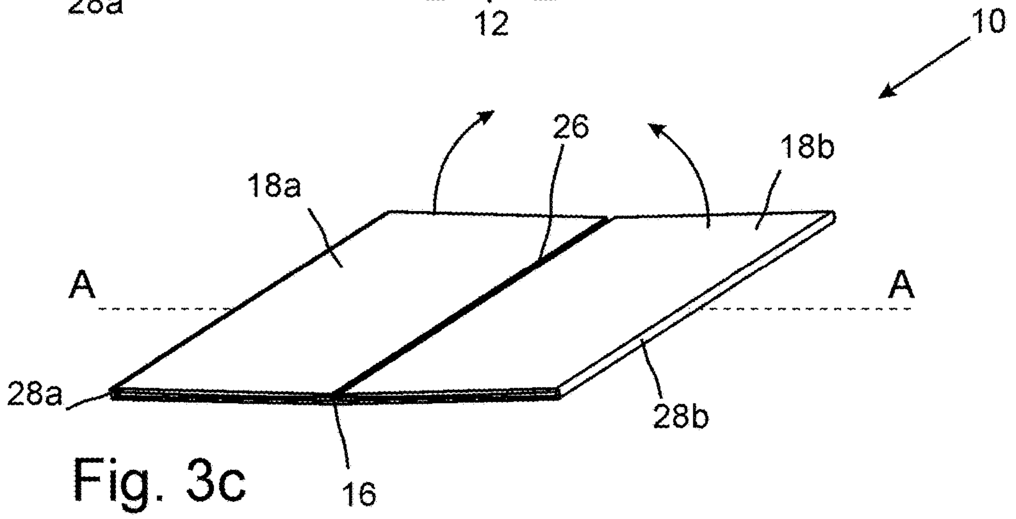
Fig. 3c

DISPLAY STAND WITH CARDBOARD BASE

CROSS-REFERENCE TO RELATED APPLICATIONS

This application is the U.S. national phase under 35 U.S.C. 371 of International Application No. PCT/EP2023/058515 filed Mar. 31, 2023, which claims priority to Germany patent application number 10 2022 108 028.5 filed Apr. 4, 2022, the disclosures of which are incorporated herein by reference in their entireties.

FIELD OF THE INVENTION

The invention relates to a display stand, a method for setting up a display stand and a method for manufacturing the display stand. In particular, the invention relates to display stands with a planar base body made of cardboard.

BACKGROUND OF THE INVENTION

A display stand is understood to be a structure or body that is designed to be raised on a planar mounting plane, i.e. in such a way that the display stand rises from the planar mounting plane. A display stand can, for example, have one or more standing surfaces and/or edges with which it stands or rests on the mounting plane. Such display stands can be used, for example, as a sign, advertising medium or other noticeable sign. In particular, a display stand can be provided with an inscription and/or an image that is clearly visible due to its position.

WO 2009/052240 A1 describes a support element made of an easily bendable material that is able to hold the bent position without any further effect of the bending force. Pressure-sensitive adhesive surfaces allow the element to be detachably affixed to surfaces such as cards or paper objects in order to support them.

KR 1020180122833A describes material for displaying information having a main body manufactured by attaching printing paper to sheets formed by plastic, foam or wood materials. The main body has first and second supports which are folded with respect to the main body so that a fold is formed. A piece of sheet metal is attached over the fold.

US20210/0319607A1 discloses a foldable cone having first and second side panels that taper upwardly. Each side wall has an outer surface, an inner surface, a lower edge, an upper edge and opposite side edges. The cone further comprises a base panel having a fold seam extending along its central portion in a direction generally parallel to the lower edges of the side panels, the base panel being folded along the fold seam. The first and second side panels are attached to each other at a predetermined location to form concave first and second side panels when the base panel is unfolded.

SUMMARY OF THE INVENTION

It can be regarded as an object to propose a display stand, a method for setting up a display stand and a method for manufacturing the display stand, with which a display stand suited be used well as a sign or advertising medium with an attractive appearance is made possible in a particularly simple and cost-effective manner.

The object is solved by a display stand and by the methods disclosed herein. Dependent claims relate to advantageous embodiments of the invention.

The inventor started from the realization that an initially flat shape is decisive for a display stand for use as a sign and/or advertising medium, both for manufacture, in particular for possible printing, and for storage or shipping. For use as a display stand, however, a three-dimensional shape should be manufactured as simply as possible.

The display stand according to the invention has at least one planar base body and a first and a second planar cover body, each of which is made of cardboard in whole or in part. The term "cardboard" is understood here to mean any flat, stiff paper product, in particular with a basis weight of at least 150 $g/m^2$. This includes in particular pasteboard and thicker paper. The term can refer to single and multi-layer products, including structural products such as corrugated cardboard.

The planar base body comprises at least a first and a second planar section, which are pivotably connected to each other by a set-up fold. The set-up fold is preferably embossed or otherwise manufactured in such a way that the planar sections can be pivoted towards each other by bending or kinking the material along the set-up fold. Due to the predetermined set-up fold, the course of the pivot edge is predetermined when the base body is kinked. This ensures, for example, a straight kink at the desired position.

An inner surface of the first cover body rests on an inner surface of the first planar section of the base body and is partially glued thereto. An inner surface of the second cover body lies on an inner surface of the second planar section and is partially glued thereto. While the covering can also be only partial, the inner sides of the first and/or second planar section are preferably predominantly (i.e. more than 50% of the surface) and particularly preferably at least almost completely (i.e. at least 90% of the surface) covered by the respective cover body. The first and second cover bodies can be separate cardboard elements, but they can also be formed together and/or with the base body from a continuous piece of cardboard, e.g. divided by folds. The bonding can be formed by various possible types of adhesive and by various possible methods of application. For example, the bond can be formed by chemically or physically setting adhesives, i.e. solvent-based adhesives, hot-melt adhesives, polymerizing adhesives, etc. It is also possible to use pressure-sensitive adhesives. The adhesive can be sprayed on, printed on or applied in another way. Particularly preferably, the adhesive bond can be formed by one or more adhesive tapes, preferably double-sided adhesive tapes, i.e. carriers with adhesive surfaces on both sides, preferably with pressure-sensitive adhesive. Preferably, one or more strips of double-sided adhesive tapes are arranged between the cover body(ies) and the inner surface(s) in order to form two-dimensional adhesive regions.

A first and a second adhesive-free pocket region are formed between the inner side of the first cover body and the inner side of the first planar section and between the inner side of the second cover body and the inner side of the second planar section. An adhesive-free pocket region is considered to be a contiguous surface area in each case in which the inner sides of the cover body and the planar section lie on top of each other, but are not connected by adhesive. The adhesive-free pocket regions are adjacent to the set-up fold, preferably directly opposite each other at the set-up fold.

According to the invention, a flat metal strip is arranged to bridge the set-up fold with at least a first part, preferably comprising a first end of the metal strip, in the first pocket region and a second part, preferably comprising a second end of the metal strip, in the second pocket region. In this case, the metal strip is held in at least one of the pocket regions without material connection to the respective cover body and planar section and thus—at least to a small extent—displaceably, i.e. in particular without bonding. Preferably, it can be displaced at least in the longitudinal direction, i.e. transversely to the course of the set-up fold. A minimum degree of displaceability in the range of, for example, 1 mm or even less may be sufficient, as will be explained in more detail below. While the metal strip can, for example, only be accommodated with the respective ends in the pocket regions, it is preferable if it is accommodated in the pocket regions over at least essentially the entire length (i.e., for example, more than 90% of the length), except for a possibly short free area at the set-up fold.

According to the invention, starting from a planar arrangement in which the first and second sections are arranged in alignment with one another in one plane, such a display stand can be brought into an angular arrangement by pivoting the first and second sections relative to one another about the set-up fold, in which the first and second sections are arranged at a set-up angle relative to one another. The set-up angle can, for example, be 120° or less, preferably 100° or less. The metal strip deforms plastically during pivoting and holds the first and second sections at the set-up angle to each other in the angular arrangement.

The manufacturing method according to the invention provides for the provision of the planar base body made of cardboard with the first and a second planar section and the set-up fold connecting them pivotably to one another. The inner surfaces of the first and second planar cover bodies made of cardboard are applied to the first and second planar sections and partially glued thereto, wherein a first adhesive-free pocket region is formed between the inner surface of the first cover body and the inner surface of the first planar section, which is adjacent to the set-up fold, and a second adhesive-free pocket region is formed between the inner surface of the second cover body and the inner surface of the second planar section, which is also adjacent to the set-up fold. The flat metal strip is arranged with a first part in the first pocket region and with a second part in the second pocket region and bridges the set-up fold, wherein the metal strip is held displaceably in at least one of the pocket regions without material connection to the respective cover body and planar section. The sequence of the process steps is not necessarily fixed; for example, the metal strip may already be arranged in one or both pocket regions when they are formed or may be introduced subsequently.

To enable the set-up angle to be held in place, a steel sheet with a thickness of 0.1 to 0.15 mm, for example, has proven to be favorable for the metal strip. In general, the material, thickness and width of the metal strip should be selected in such a way that, on the one hand, good kinkability is achieved and, on the other hand, sufficient holding force is achieved.

The metal strip can be arranged on one or both sides of the set-up fold completely, i.e. with its entire surface within the adhesive-free pocket region, so that it is held on at least one of the sides over its entire surface without material connection only by the boundaries of the pocket region, i.e. in particular not by an adhesive. Alternatively, however, it can also be provided that—at least on one side—the metal strip is located with the predominant (i.e. more than 50%, preferably more than 75%, particularly preferably more than 90%) proportion of its surface on the respective side of the fold in the adhesive-free pocket region, but is nevertheless fixed by adhesive at one or more points, for example at one or more edges of the respective adhesive-free pocket region. Particularly with a partially flexible adhesive and only a small proportion of the surface area, the metal strip can still move by the required minimum amount during bending despite the proportionally small amount of adhesive.

The display stand according to the invention and the method according to the invention thus allow a spatial shape of the display stand to be manufactured in a particularly simple manner. A desired set-up angle produced by pivoting can be maintained by plastic deformation of the metal strip.

The display stand according to the invention is particularly suitable for a visually appealing presentation, for example as an advertising medium. For this purpose, for example, one or both of the outer surfaces opposite the inner surfaces of the first and/or second planar section can be printed. The set-up fold enables a precisely localized, straight edge to be produced. The movability of the metal strip prevents the metal strip and/or the material of the base body from being compressed during pivoting, so that cracks, bulges and other undesirable deformations do not occur, especially on the outer surfaces. By only partially bonding the inner surfaces of the cover body and base body, a pocket region that is well suited for holding the metal strip is formed in a particularly simple manner.

It is possible that the metal strip is only held displaceably in one of the pocket regions, while it is fixed in the other pocket region. Preferably, the metal strip is held in both pocket regions so that it can be moved relative to the base body and the cover bodies without a material connection. This has proven to be favorable in order to avoid or reduce deformations, in particular of the base body, when setting up a display stand, i.e. when pivoting the planar sections relative to each other to manufacture an angular arrangement.

Preferably, the inner surface of the first cover body is glued to the inner surface of the first planar section in a first adhesive region, wherein the first adhesive region surrounds the pocket region on three sides. Thus, the pocket region is surrounded by a continuous adhesive region, with the fourth side preferably being formed by the set-up fold. In the same way, a second adhesive region can preferably be formed between the second cover body and the second planar section, which surrounds the second adhesive-free pocket region there.

According to a further development, the first and/or second cover body can be formed in one piece with the base body. For this purpose, the respective cover body can, for example, be pivotably connected to the first and/or second section by an end fold. The respective cover bodies can then be placed on the inner surface of the respective section of the cover body by folding them over at the end fold. It is particularly preferable for the base body to be formed in one piece with both cover bodies. The end fold also preferably runs parallel to the set-up fold.

The inside of the base body can, for example, be completely covered by the two cover bodies. However, an arrangement in which the set-up fold on the inner surface of the base body is not or not completely covered by the cover bodies is preferred.

According to a preferred embodiment, the first and second cover bodies are arranged at a distance from each other along the set-up fold. This makes it particularly easy to pivot the sections relative to each other around the set-up fold in order to manufacture an angular arrangement. Due to the distance and the resulting free area between the internally arranged cover bodies, no or less material needs to be displaced when pivoting or folding. This reduces or completely avoids the otherwise possible undesirable deformation of the planar sections and the set-up fold. The distance between the first and second cover bodies can be, for example, 0.3 to 5 mm, preferably 0.5 to 3 mm, particularly preferably 1-2 mm.

For this purpose, it may be preferable, for example, that the first and/or the second section of the base body has a length (to be measured at right angles to the set-up fold) that is greater than the respective length of the associated cover body. By shortening the cover bodies, a distance or a free area on the inside of the set-up fold can be achieved, which simplifies folding along the set-up fold and avoids or reduces undesirable deformations.

For example, the length of the first and/or second section of the base body can be greater than the length of the first and/or second cover body by an amount of 0.2 to 2 mm.

The dimensions of the display stand as a whole and in particular of the pocket regions can be selected differently for different requirements. According to a preferred embodiment, the first and/or the second pocket region can have a length, measured in each case at right angles to the set-up fold, which is less than 80% of a length of the first and/or the second section. The respective pocket region (and preferably also the metal strip accommodated therein) then extends over only a part of the length of the respective section of the base body. Preferred dimensions for the length of the respective pocket region and/or the length of the respective part of the metal strip accommodated therein can be, for example, at least 10%, preferably at least 20% of the length of the respective section.

According to a preferred embodiment, at least one slot may be formed on the first and/or second planar section and/or on the first or second planar cover body, which penetrates the planar section or cover body. The slot may be positioned and dimensioned to allow insertion of the metal strip into the first and/or second pocket region. Preferably, only one slot is formed at one of the pocket regions, particularly preferably in the region of its end facing away from the set-up fold. The slot is preferably arranged in such a way that the metal strip can be pushed through it in the longitudinal direction.

BRIEF DESCRIPTION OF THE DRAWINGS

In the following, embodiments of the invention are described in more detail with reference to drawings, thereby show:

FIG. 1 a perspective view of a first embodiment of a set up a display stand in a spatial form of use;

FIG. 2 the display stand from FIG. 1 in a top view of an unfolded form;

FIG. 3*a*-3*c* Steps in the manufacture of the set up a display stand from FIG. 1, FIG. 2 starting from the unfolded form from FIG. 2;

DETAILED DESCRIPTION OF EMBODIMENTS

Figure 5:
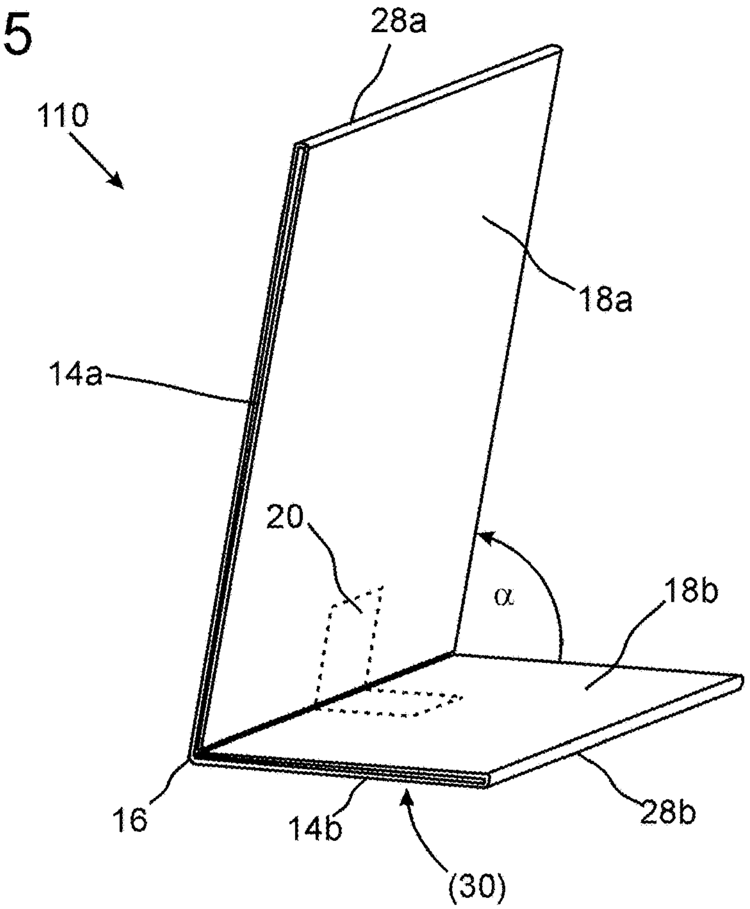
FIGS. 5, 6 perspective views of a second embodiment of a set up a display stand in its spatial form of use.
Figure 6:
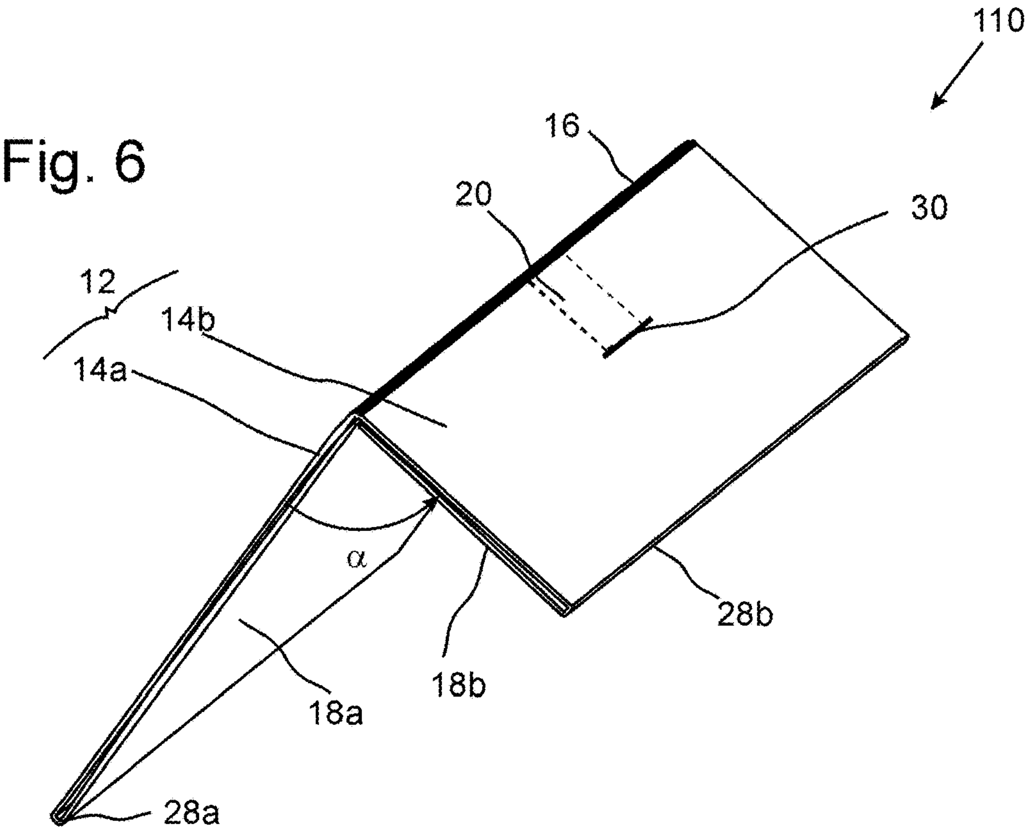

FIG. 10 shows a first embodiment of a display stand 10, in which two planar sections 14*a*, 14*b* of a base body 12 made of cardboard form an angular arrangement in which they are arranged at a set-up angle α relative to one another. Such a display stand 10 can, for example, serve as a sign or advertising medium, whereby the outer surfaces of the base body 12 shown in FIG. 1 above can be printed. The display stand can be set up on edges of the planar sections 14*a*, 14*b* of the base body 12 as shown in FIG. 1 or, in particular with a set-up angle α of less than 90°, can also be set up on one of the outer surfaces, as shown below with reference to a second embodiment (FIGS. 5, 6).

The prerequisite in each case is that the set-up angle α is maintained, which is not guaranteed by the cardboard material of the base body 12 alone. As indicated in FIG. 1 and explained in more detail below, the display stand 10 has a concealed metal strip 20 which is plastically deformable when the planar sections 14*a*, 14*b* of the base body 12 are pivoted about a set-up fold 16 and thus holds the set-up angle α in the angular position shown in FIG. 1.

FIG. 2 shows the display stand 10 in an unfolded form. The base body 12 with the planar sections 14*a*, 14*b* and the set-up fold 16 formed therebetween is formed in one piece from cardboard material with a first and a second planar cover body 18*a*, 18*b*, which are foldably, i.e. pivotably connected to the base body 12 via end folds 28*a*, 28*b*. Measured at right angles to the set-up fold 16, the planar sections 14*a*, 14*b* of the base body 12 in the embodiment shown each have identical lengths B1 and the cover bodies 18*a*, 18*b* adjoining them also have identical lengths B2 (although the lengths may differ in deviating embodiments). The length B2 of each of the cover bodies 18*a*, 18*b* is shorter by a certain amount, for example 1-2 millimeters, than the length B1 of the respective adjacent planar section 14*a*, 14*b* of the base body 12.

Adhesive regions 24*a*, 24*b* are formed on the inner surface of the base body 12, each of which surrounds adhesive-free regions 22*a*, 22*b* from three sides. The adhesive-free areas 22*a*, 22*b* are opposite each other via the set-up fold 16.

The sequence of FIGS. 3*a*-3*c* shows steps in the manufacture of the display stand 10 in one possible order. Starting from a planar piece of cardboard material, which is divided into the planar sections 14*a*, 14*b* and cover bodies 18*a*, 18*b* by inserting the set-up fold 16 and the end folds 28*a*, 28*b*, the inner sides of the planar sections 14*a*, 14*b* and the cover bodies 18*a*, 18*b* are folded together by folding at the end folds 28*a*, 28*b* after applying adhesive to the adhesive regions 24*a*, 24*b* (not shown in FIGS. 3*a*-3*c*). Prior to this, the metal strip 20 can be placed on the middle adhesive-free areas 22*a*, 22*b* (also not shown in FIGS. 3*a*-3*c*). Alternatively, the metal strip 30 can also be inserted subsequently.

By folding the cover bodies 18*a*, 18*b*, their inner sides and the inner sides of the planar sections 14*a*, 14*b* adhere to each other by the adhesive regions 24*a*, 24*b*. The adhesive-free areas 22*a*, 22*b* form pockets between the inner sides in which the metal strip 20 is accommodated. This is shown in section in FIG. 4. The metal strip 20 bridges the set-up fold 16 and is received on both sides in adhesive-free pocket regions 22*a*, 22*b*. Thus, the metal strip 20 is held clamped between the inner surfaces of the planar section 14*a*, 14*b* and the cover bodies 18*a*, 18*b*, but without material connection, i.e. in particular without bonding.

The adhesive-free pocket regions 22*a*, 22*b* are slightly larger than the metal strip 20, so that the latter is accommodated therein with a certain amount of play, i.e. can be displaced parallel to the inner surfaces to at least a small extent.

Figure 4:
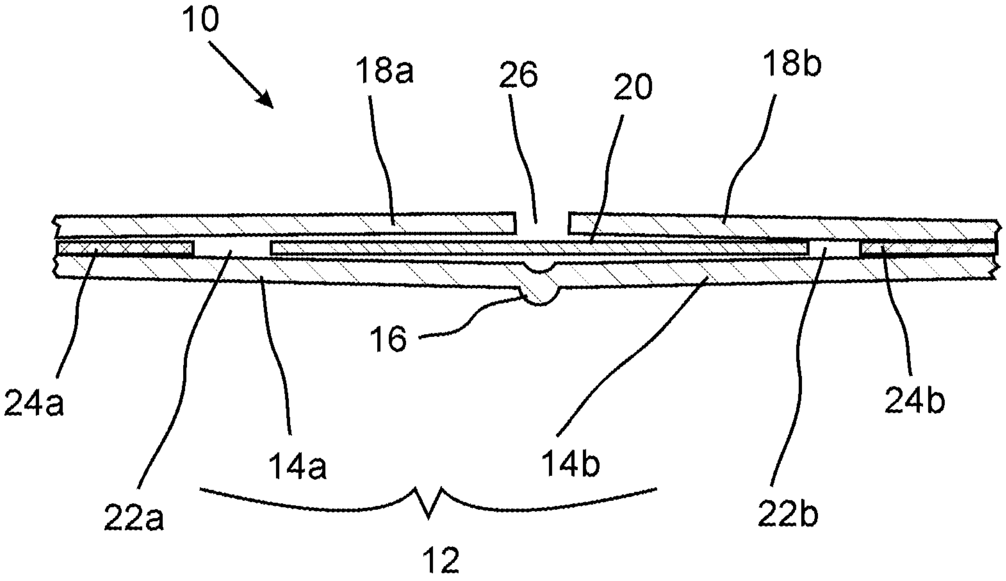
FIG. 4 a partially shown cross-section through the display stand in FIGS. 1-3*c* in a planar arrangement as shown in FIG. 3*c*

As shown further in FIG. 4, when the cover bodies 18*a*, 18*b* are folded, a free area 26 is formed between their edges in the area of the set-up fold 16, i.e. they form a gap of a few millimeters, for example.

The structure formed in this way and shown in FIG. 4 is particularly suitable for folding around the set-up fold 16, i.e. for pivoting the planar sections 14*a*, 14*b* towards each other to form the set-up angle α. The set-up fold 16 embossed into the material predetermines its position and straight course. During folding, the metal strip 20 deforms plastically, but can displace within the adhesive-free pocket regions 22*a*, 22*b*, so that the cardboard material is not stretched or compressed, which could otherwise lead to undesirable deformation or even tearing of the material. Due to the free area 26, the edges of the cover bodies 18*a*, 18*b* do not abut each other (or at least not to a significant extent), so that material compression is also avoided or at least reduced here.

Thus, with the illustrated structure of the display stand 10, the angular arrangement (FIG. 1) of the display stand 10 can be achieved particularly easily and stably starting from an initially planar arrangement (see, for example, FIG. 3*c*). The display stand 10 can thus, for example, be processed (e.g. printed), stored and/or transported or shipped in a planar arrangement and only brought into the angular arrangement (FIG. 1) during use.

Various variations of the embodiment shown are possible. For example, the adhesive regions 24*a*, 24*b* are shown above on the inner sides of the planar portions 14*a*, 14*b* of the base body 12; alternatively or additionally, adhesive may also be applied to the inner sides of one or both of the cover bodies 18*a*, 18*b* during manufacture. While it was assumed above that the adhesive areas 24*a*, 24*b* are continuous, adhesive can also be applied intermittently in these areas, for example in the form of dots or lines. The dimensions and relative dimensions of the planar sections 14*a*, 14*b* of the base body 12 as well as the adhesive-free areas 22*a*, 22*b* and the metal strip 20 shown are merely exemplary and may vary for different embodiments; in particular, the base body 12 need not be symmetrically divided as shown, but one of the planar sections 14*a*, 14*b* may differ in size and/or shape from the other section.

Figure 7:
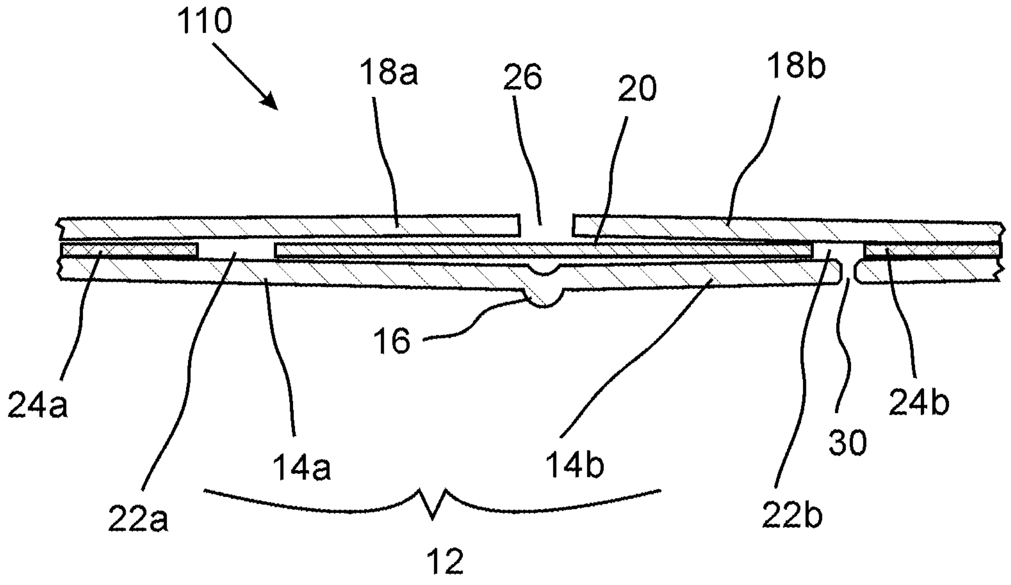
FIG. 7 a partial cross-section of the display stand shown in FIGS. 5, 6 in a planar arrangement.

FIGS. 5-7 show a display stand 110 according to a second embodiment. The display stand 110 according to the second embodiment largely corresponds to the display stand 10 according to the first embodiment. Identical parts and elements are marked with identical reference signs. Only the differences are described in more detail below.

The display stand 110 according to the second embodiment has surfaces of different lengths, i.e. the first planar section 14*a* and the first planar cover body 18*a*, measured starting from the fold 16, have a significantly greater length than the second planar section 14*b* and the second planar cover body 18*b*. The length may, for example, be at least twice the length of the second planar section 14*b* and cover body 18*b*. The angle α is less than 90°. Thus, the display stand 110 is particularly suitable to be set up on the shorter second planar section 14*b* as a base, so that the first planar section 14*a* stands upright, for example, as a shield, as shown in FIG. 5.

For inserting the metal strip 20, a slot 30 is formed on the second planar section 14*b*, i.e. on the underside of the foot (see FIG. 6), which penetrates the second planar section 14*b* and makes the pocket region 22*b* formed between the second planar section 14*b* and the second cover body 18*b* accessible. This is shown in section in FIG. 7. The slot 30 is arranged at the longitudinal end of the pocket region 22*b* such that the metal strip 20 can be inserted through the slot 30 into the pocket regions 22*a*, 22*b*.

The invention claimed is:

1. Display stand, with a planar base body made of cardboard, comprising at least a first and a second planar section, which are pivotably connected to each other by a set-up fold, a first and a second planar cover body, made of cardboard, an inner surface of the first cover body, resting on an inner surface of the first planar section and being partially glued thereto and an inner surface of the second cover body resting on an inner surface of the second planar section and being partially glued thereto, wherein a first adhesive-free pocket region is formed between the inner side of the first cover body and the inner side of the first planar section, which is adjacent to the set-up fold, and a second adhesive-free pocket region is formed between the inner side of the second cover body and the inner side of the second planar section, which is adjacent to the set-up fold, and wherein a flat metal strip bridging the set-up fold is arranged with a first part in the first pocket region and with a second part in the second pocket region, wherein the metal strip is held displaceably in at least one of the pocket regions without material connection to the respective cover body and planar section.

2. The display stand according to claim 1, wherein the metal strip is held displaceably in both pocket regions between the base body and the cover bodies without material connection.

3. A display stand according to claim 1, wherein the inner surface of the first cover body is glued to the inner surface of the first planar section in a first adhesive region, wherein the first adhesive region surrounds the first pocket region on three sides.

4. A display stand according to claim 1, wherein the first and/or second cover body is formed in one piece throughout with the base body and is pivotably connected to the first and/or second section of the base body by an end fold.

5. A display stand according to claim 4, wherein the end fold runs parallel to the set-up fold.

6. A display stand according to claim 1, wherein the first and second cover bodies are arranged at a distance from one another along the set-up fold.

7. A display stand according to claim 1, wherein the first and/or second section has a length measured at right angles to the set-up fold, and the first and/or second cover body has a length measured at right angles to the set-up fold, wherein the length of the first and/or second section is greater than the length of the first and/or second cover body.

8. A display stand according to claim 7, wherein the length of the first and/or second section is greater than the length of the first and/or second cover body by an amount of 0.2-2 mm.

9. A display stand according to claim 1, wherein the first and/or second pocket region has a length, measured at right angles to the set-up fold, which is less than 80% of a length of the first and/or second section, measured at right angles to the set-up fold.

10. A display stand according to claim 1, wherein a slot is provided on the first and/or second planar section and/or on the first or second planar cover body, which slot allows the metal strip to be inserted into the first and/or second pocket region.

11. Method for setting up a display stand, in which a display stand according to claim 1, starting from a planar arrangement in which the first and second sections are arranged in alignment with one another, is brought into an angular arrangement by pivoting the first and second sections relative to one another about the set-up fold, in which the first and second sections are arranged at a set-up angle relative to one another wherein the metal strip plastically deforms during pivoting and, in the angular arrangement, the metal strip holds the first and second sections at the set-up angle relative to one another.

12. A method for manufacturing a set up a display stand according to claim 1, wherein the planar base body made of cardboard with the first and a second planar section and the set-up fold connecting them pivotably to one another is provided, the inner surfaces of the first and second planar cover bodies made of cardboard are applied to the first and second planar sections and partially glued thereto, wherein a first adhesive-free pocket region is formed between the inner surface of the first cover body and the inner surface of the first planar section which pocket region is adjacent to the set-up fold, and a second adhesive-free pocket region is formed between the inner side of the second cover body and the inner side of the second planar section, which pocket region is adjacent to the set-up fold, and wherein the flat metal strip is arranged bridging the set-up fold with a first part in the first pocket region and with a second part in the second pocket region, wherein the metal strip is held displaceably in at least one of the pocket regions without material connection to the respective cover body and planar section.

13. The method according to claim 12, wherein the flat metal strip is already arranged in the pocket regions when they are formed.

14. The method according to claim 12, wherein the flat metal strip is inserted into the pocket regions through a slot after they have been formed.

* * * * *